(12) United States Patent
Mao

(10) Patent No.: US 10,984,461 B2
(45) Date of Patent: Apr. 20, 2021

(54) SYSTEM AND METHOD FOR MAKING CONTENT-BASED RECOMMENDATIONS USING A USER PROFILE LIKELIHOOD MODEL

(71) Applicant: PayPal, Inc., San Jose, CA (US)

(72) Inventor: Zexi Mao, Millbrae, CA (US)

(73) Assignee: PayPal, Inc., San Jose, CA (US)

( * ) Notice: Subject to any disclaimer, the term of this patent is extended or adjusted under 35 U.S.C. 154(b) by 95 days.

(21) Appl. No.: 16/232,907

(22) Filed: Dec. 26, 2018

(65) Prior Publication Data

US 2020/0211083 A1 Jul. 2, 2020

(51) Int. Cl.
*G06Q 30/06* (2012.01)
*G06N 7/00* (2006.01)

(52) U.S. Cl.
CPC ..... *G06Q 30/0631* (2013.01); *G06Q 30/0603* (2013.01); *G06N 7/005* (2013.01)

(58) Field of Classification Search
CPC ....................... G06Q 30/0603; G06Q 30/0631
USPC .............................................. 705/26.1, 26.7
See application file for complete search history.

(56) References Cited

U.S. PATENT DOCUMENTS

| | | | |
|---|---|---|---|
| 7,676,400 B1 | 3/2010 | Dillon | |
| 8,001,008 B2 * | 8/2011 | Engle | G06Q 30/0625 705/26.62 |
| 9,047,654 B2 * | 6/2015 | Vanhoucke | G06T 7/00 |
| 9,141,982 B2 * | 9/2015 | van Coppenolle | G06Q 30/06 |
| 10,853,424 B1 * | 12/2020 | Mandaviya | G06N 7/005 |
| 10,853,763 B1 * | 12/2020 | Armstrong | G06Q 10/087 |
| 2006/0041548 A1 * | 2/2006 | Parsons | G06F 16/954 |
| 2011/0213655 A1 * | 9/2011 | Henkin | G06O 30/0251 705/14.49 |
| 2012/0089621 A1 | 4/2012 | Liu et al. | |
| 2014/0289239 A1 | 9/2014 | Kanigsberg et al. | |
| 2015/0012318 A1 * | 1/2015 | Hedman | G06Q 50/10 705/7.13 |
| 2017/0270208 A1 * | 9/2017 | Spathelf | G06Q 30/0623 |

OTHER PUBLICATIONS

Zhao, Feng et al. " Entity-Based Language Model Smoothing Approach for Smart Search"; Jan. 1, 2018; published in Special Section on Key Technologies for Smart Factory of Industry 4.0, IEE Access vol. 6, 2018, published Jan. 1, 2018, extracted from Google Scholar on Jul. 10, 2020.*

(Continued)

*Primary Examiner* — Yogesh C Garg
(74) *Attorney, Agent, or Firm* — Haynes and Boone, LLP

(57) ABSTRACT

Aspects of the present disclosure involve systems, methods, devices, and the like for making content-based recommendations using a user profile likelihood model. In one embodiment, a system is introduced that includes a plurality of models and storage units for storing, managing, and transforming product and user profile data. The system can also include a recommendation engine designed to determine a probability that a product is relevant to a user based on a user profile. In another embodiment, the probability that a product is relevant to a user may be determined based in part on a frequency of interactions with a product and a time of interaction with the products.

20 Claims, 6 Drawing Sheets

(56) References Cited

OTHER PUBLICATIONS

Dubey, Gaurav et al., "A research study of sentiment analysis and various techniques of sentiment classification"; International Journal of Data Analysis Techniques and Strategies8.2: 122-42. Inderscience Enterprises. (2016); etxtracted from Diallog database on Dec. 5, 2020.*

2016-80893, Jun. 2015, Derwent, Bhatia, G06F16/9535*

Wang et al. "Recommendations based on semantically enriched museum collections", Web Semantics: Science, Services and Agents on the World Wide Web 6 (2008) 283-290. Retrieved on Feb. 21, 20202. Retrieved from <URL: https://www.sciencedirect.com/science/article/abs/pll/S1570826808000681>.

Xue et al. "User language model for collaborative personalized search", ACM Transactions on information Systems (TOIS) Mar. 2009 Article No. 11. Retrieved on Feb. 20, 2020. Retrieved from <URL: https://dl.acm.org/doi/abs/10.1145/1462198.1462203>.

Zhai, Chengxiang, et al. "A Study of Smoothing Methods for Language Models Applied to Ad Hoc Information Retrieval" In ACM SIGIR Forum AMC (2017), vol. 51, No. 2, pp. 268-276.pp.

MacKay, David J. C., et al. "A Hierarchical Dirichlet Language Model" Natural Language Engineering 1.3 (1995), pp. 289-308.

* cited by examiner

SYSTEM AND METHOD FOR MAKING CONTENT-BASED RECOMMENDATIONS USING A USER PROFILE LIKELIHOOD MODEL

TECHNICAL FIELD

The present disclosure generally relates to communication devices for making content-based recommendations, and more specifically, to communication devices for making content-based recommendations using a user profile likelihood model.

BACKGROUND

In the advent of technology, users have moved to the use of electronic devices as a source of communication and for transacting in everyday life. Such use often includes the interaction and access of internet websites for news, social content, purchases, and the like. In some instances, websites are frequented for making online purchases. However, with the vast amount of information and number of websites available, a user may oftentimes be found looking through products and/or services that may not be of interest. As such, this may lead to a loss of time and purchase for a user and consequently to a loss of a sale to the merchant. Therefore, to avoid loss, it would be beneficial to create a system that can present a user with customizable content tailored to a user's interest and likes.

Figure 1:
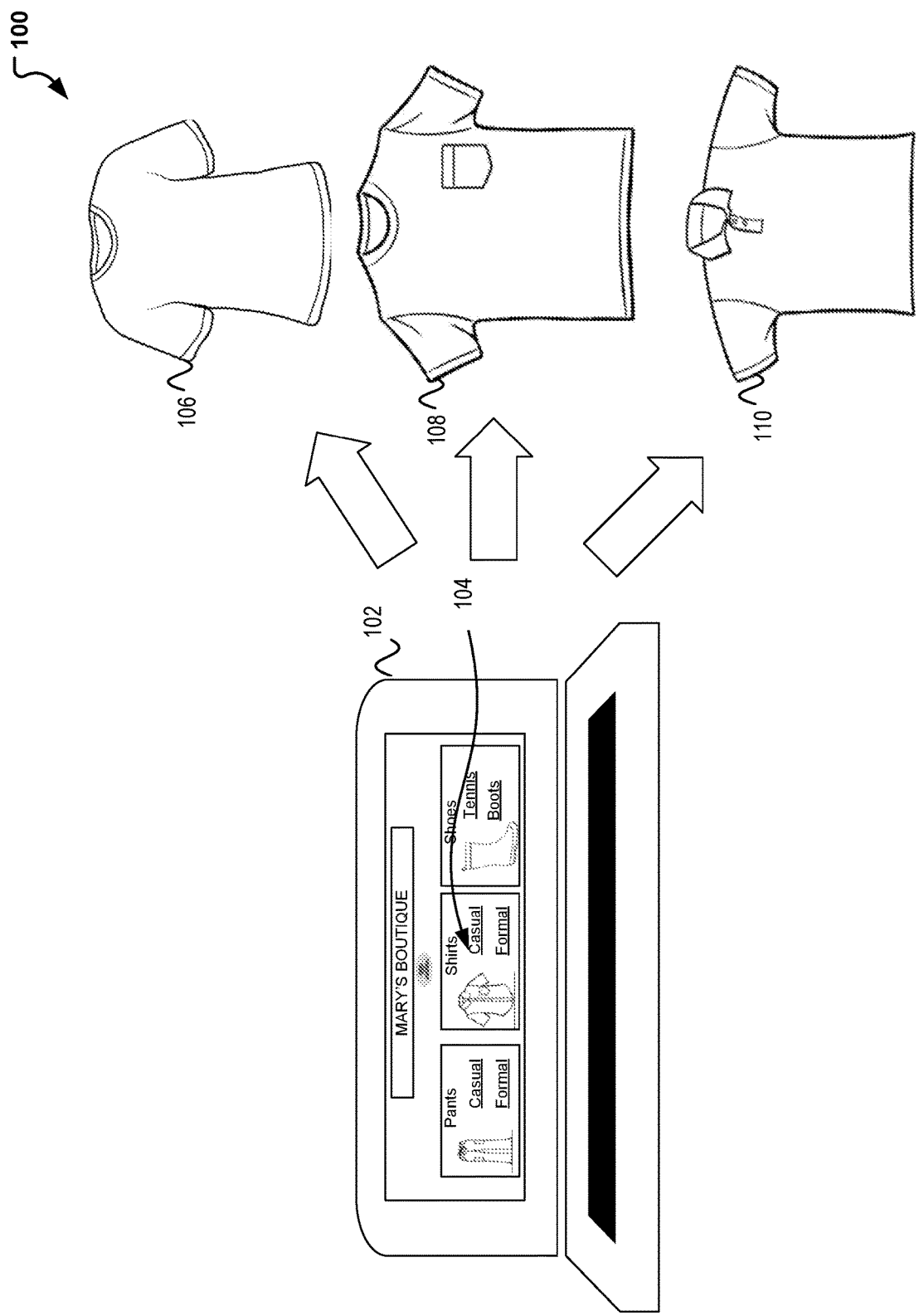
FIG. 1 illustrates a diagram of a recommendation using a standard search.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for making content-based recommendations using a user profile likelihood model. In one embodiment, a system is introduced that includes a plurality of models and storage units for storing, managing, and transforming product and user profile data. The system can also include a recommendation engine designed to determine a probability that a product is relevant to a user based on a user profile. In another embodiment, the probability that a product is relevant to a user may be determined based in part on a frequency of interactions with a product and a time of interaction with the products.

Conventionally, purchasing, searching, and locating a good or service online has become a very time-consuming task. With the vast amount of information currently available, tailored recommendations and insights may not be possible and/or the amount of detail that may be captured and presented may be too large to parse through. For example, consider FIG. 1 which illustrates a diagram of a recommendation using a standard search. The standard search can include the display of a website that may be selected by a user on a user device 102.

The user device 102 can include one or more smart devices enable to communicate with a network. The communication can include wired and/or wireless communications. Additionally, the user device 102 can include but is not limited to a smart phone, laptop, tablet, desktop, smart watch, goggles, VR equipment, and the like. Where the user device may be used for numerous tasks including but not limited to web browsing, video streaming, bill pay, and purchase of goods and services. As illustrated in FIG. 1, user device 102 is used for interacting with Mary's Boutique website. At Mary's Boutique, various items for purchase are available including but not limited to pants, shirts, shoes, as well as other products not displayed.

Here, a user is interested in looking at casual shirts 104 available for purchase at Mary's Boutique. As a result, a user may be redirected to a secondary user interface which can provide numerous casual shirts available for sale at Mary's Boutique. The shirts for display may include plain shirts 106, pocketed shirts 108 and collared shirts 110, etc. In addition, other shirts may be displayed which are not displayed or mentioned here. Thus, the user's standard search for a causal shirt resulted in the display of various shirts with varying features and styles. Unfortunately, the user is left considering all shirts available without customization or reference to what the user may actually be interested in looking at and considering for purchase. Further, if the user does not find a shirt at Mary's Boutique, similar search results may be encountered on other sites, and the user may need to continue looking through other merchant sites. This can lead to a very time consuming and complex search where parsing through the various websites may not be very fruitful. Therefore, a method or system that is able to present customizable content based on a user's interest would be beneficial.

Figure 2:
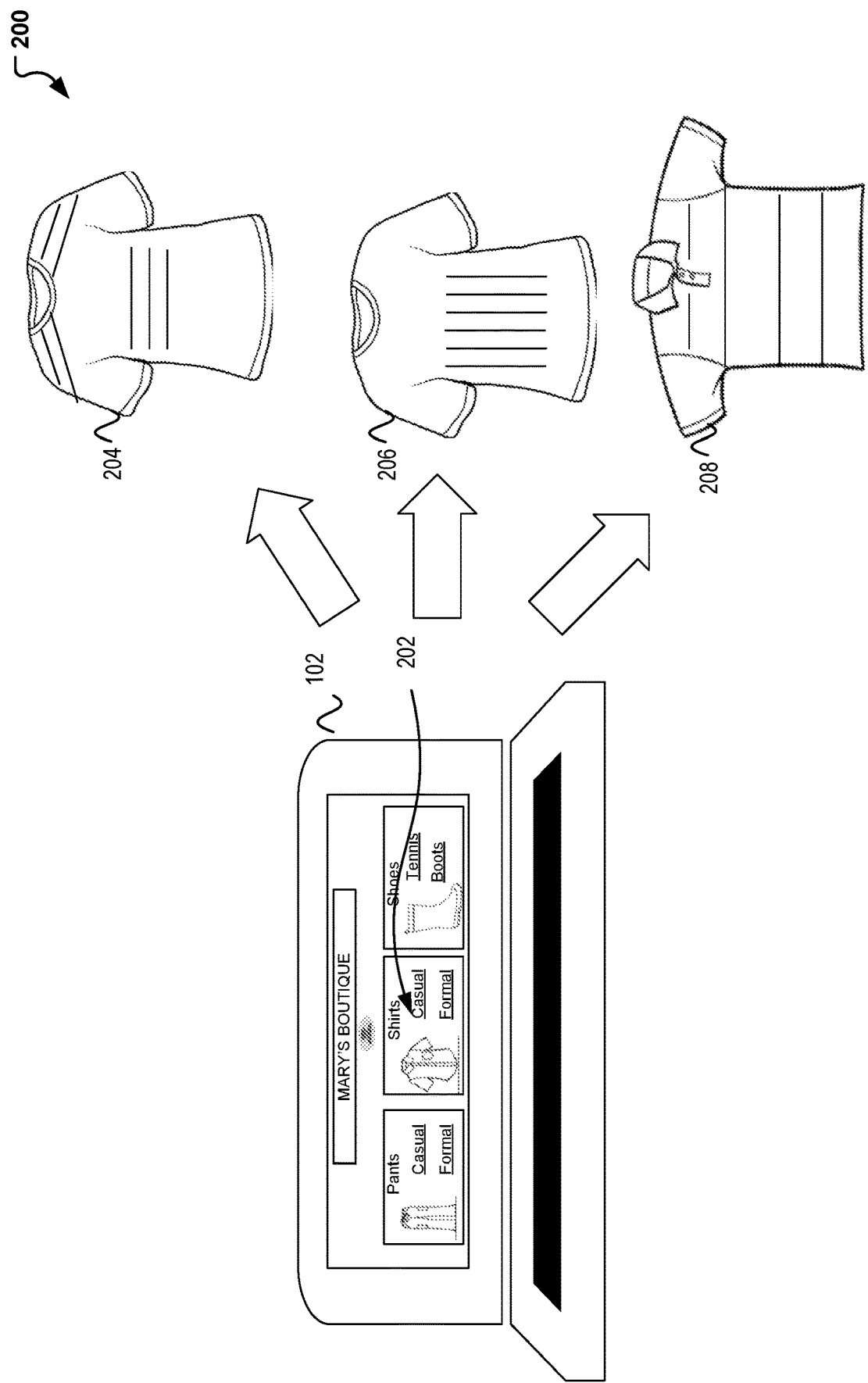
FIG. 2 illustrates a diagram of a content-based recommendation using a user profile likelihood model.

In one embodiment, a system and method that performs content-based recommendations is presented. In particular, a system and method for making content-based recommendations using a user profile likelihood model is presented. Turning to FIG. 2, a diagram illustrating such an exemplary use of such system. Continuing with the previous example, here again a user is illustrated interacting once again with a user device 102 in search for a casual shirt 202. Again, the user encounters various search results which provide Mary's Boutique as a merchant where the user may find the casual shirt he/she is looking for. Therefore, in searching for casual shirts 202, a variety of causal shirts 204-208 are presented to the user. In this search however, the user is instead presented with various basic shirts and collared shirts. Here, the system and method for making content-based recommendations has been implemented and as such, it was determined that the user does not generally buy pocketed shirts and/or does not like shirts with pockets. Additionally, as a result of the user profile likelihood scheme used for making recommendations, it was identified that the user has a preference for stripped shirts. As a result, the user is provided with more customizable results which are better suited and tailored the user's interests.

As indicated, the user has an interest in stripped shirts. Therefore, merchandise results from Mary's Boutique are tailored and include two types of plain shirts 204, 206 with varying stripe styles. Additionally, the user is identified to have previously purchased or has a user profile that indicates a liking for collared shirts. As such, a new arrival with stripes 208 is also presented to the user for consideration. This in turn providing the user with more tailored results which can results in a faster search and purchase for the user and consequently a new sale for the merchant.

Therefore, with this in mind, in one embodiment, a user profile likelihood model, system, and method are introduced for making content-based recommendations. The system for making the content-based recommendations may include an architecture such as that exemplified at FIG. 3. In this exemplary recommendation architecture 300 will be provided to describe an example case where a recommendation is for merchant products however, recommendations are not limited to the use of products and/or merchants for the use of the content-based recommendation model.

Considering this exemplary recommendation architecture, in order to make a user-profile tailored content-based recommendation, content for making the recommendations is presented and obtained from two sources. A first source of data may derive from a merchant 302 and the second source of data may derive from the user device 102. Note that as indicated, the merchant 302 is used for exemplary purposes and can be replaced by a service provider, or other entity providing a recommendation that takes into account a combination of content and user profile information.

At the merchant 302, a catalog generally exists with the various products available for purchase by a user. To ensure all the existing and new products available at the user are also available as options when presenting recommendations, the merchant may send the product catalog to a product processing job module 304 which can receive batched catalog data from the merchant on a scheduled basis. The batched data may arrive at the product processing job module 304 on a daily basis, weekly basis, or other predefined interval basis and/or dynamic basis. The product processing job module 304 then is triggered every time new product catalog data is received and processes the product catalog data. In processing the product catalog data, the product processing job module 304 receives the product catalog data, which is oftentimes unstructured and extracts any semantic attributes about or associated with the product catalog data. For example, semantic attributes (or text tokens) associated with a product catalog can include taxonomy, brand, attributes from a title, attributes from a product description, product gender, product condition (e.g., is it new or used), pricing, size, material, etc. Extracting the semantic attributes helps in making the data more manageable and ensuring it may be later processed by the rest of the modules based in part on the semantic attributes. To extract the semantic attributes, rules and natural language processing algorithms may be used and defined to generate the more structured product inventory data with the semantic attributes. Then, once the data is now structured, it may be saved into a product inventory database 306 for use by a recommendation engine 320.

To present an example of semantic attribute extraction, consider a product described as follows:
  Product name: Calvin Klein Cap Sleeve Envelope Sheath Dress
  Brand: Calvin Klein
  Taxonomy: women>clothing>dresses
  Size class: regular
  Description: Solid ponte knit hugs your curves and shapes your figure in a cap sleeve midi, outfitted with a goldtone zipper and gaux wrap skirt.
  Crew neck
  Cap sleeves
  Exposed back zip closure
  Unlined
  Appox. 35" length The extracted semantics for the product described can therefore include: brand—Calvin Klein, taxonomy—women, size, woman, title—cap sleeve, title—sheath dress, description—crew neck, description—faux wrap skirt, etc. Thus, the product inventory database 306 can include the storage of the extracted semantics similar to those described.

Once the structured data is ready for use by the recommendation engine 320, the structured data in the product inventory database 306 is once again processed by an inventory creation job module 310. In some instances, the size of the structured data that was stored in the product inventory database 306 may be too large to be managed and processed by the recommendation engine 320. In those instances, the inventory creation job module 310 is used to compress the structured data into more compressed semantic attributes. Thus, after the data is structured data is compressed, it may again be stored in a recommendation inventory database 316 available for use by the recommendation engine 320. The ability to store the compressed data into the recommendation inventory database 316 is to enable the recommendation faster and access to the recommendation engine 320.

Note that several databases and data processing modules are explained herein, however more or less databases and modules may be used for processing and storing the product catalog information received from the merchant 302.

Next, consider the information that may obtained from the user device 102 for use in making the content-based recommendations 322. To make a tailored recommendation, a user profile or user profile database 318 may be created for the user and use by the recommendation engine 320 in conjunction with the recommendation inventory 316. The user profile database 318 may be a storage of various actions, products viewed or purchased, and other events performed by the user. In one embodiment, the user profile database 316, can include product catalog data from the inventory database 306 that includes products the user has purchased from the merchant 302. In other embodiments, the user profile database 316, can include those products, actions, and events performed by the user based in part on the use of tracking to gather the user's events. To track the user's events, the merchant may establish tracking mechanisms that enable the merchant to gather details on what the user does. In other embodiments, the user may provide specific details on likes and dislikes, enable a tracking mechanism on the phone, etc. that may be used for tracking. As an example, a merchant may track a user that is logged into the merchant site. The user's product views, purchases, returning, etc. may thus be tracked upon the dispatch of an event or trigger that the user is on the site using an event dispatcher 308. As another example, a user may enable access to a merchant to view, track, and map website navigation through that merchant 302 and other merchant sites. Similarly, other events may be tracked. Therefore, with the information gathered, a content-based recommendation may be made based in part on products purchased with that or other merchants.

Figure 3:
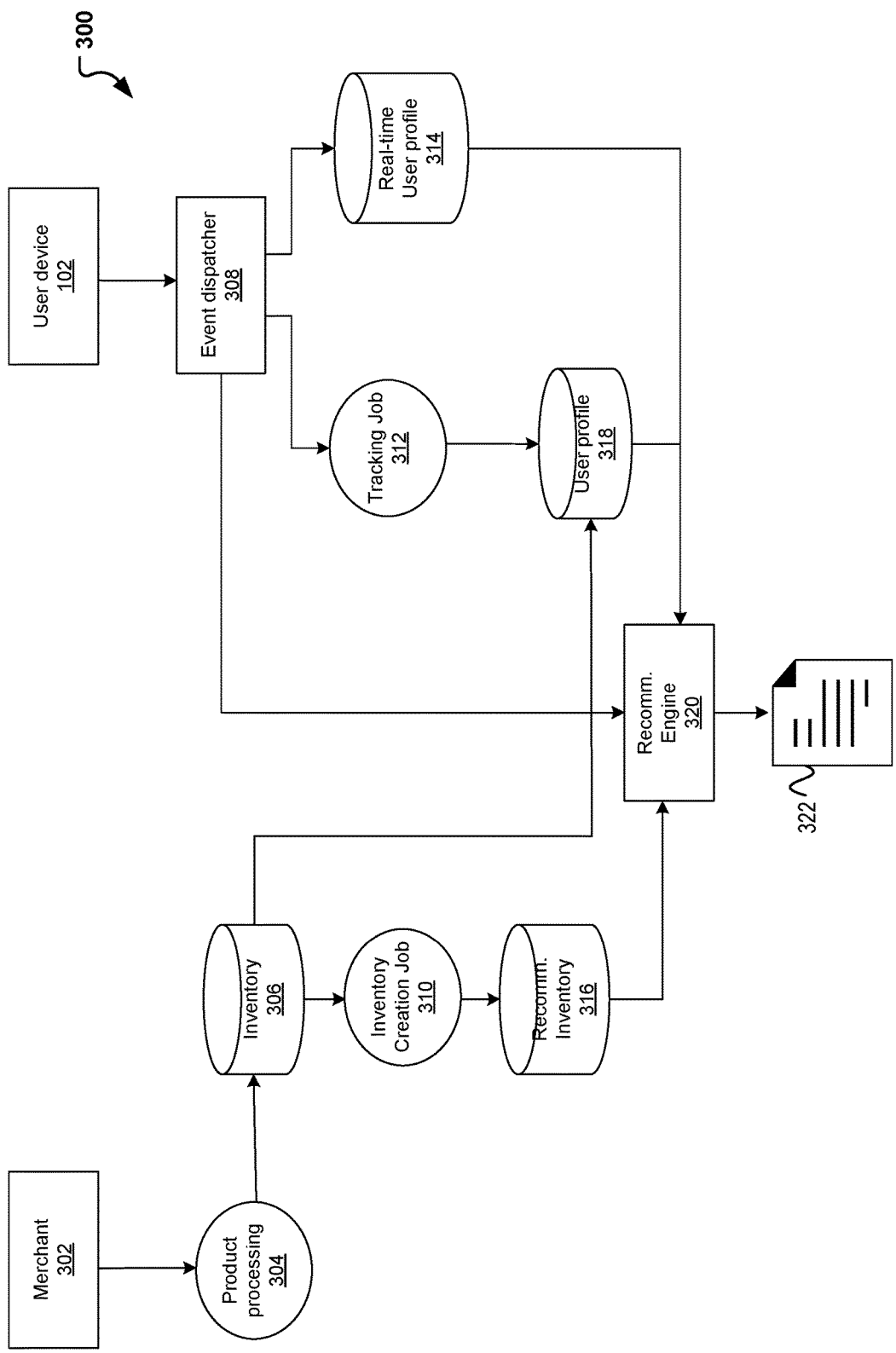
FIG. 3 illustrates block diagram of a communication and system-based implementation for making content-based recommendations using a user profile likelihood model.

Turning to FIG. 3, a user profile may be created as a result of user events that are tracked using at least an event dispatcher module 308. As a user events occur, the event dispatcher module 308 maybe used and collected. Then, in order to process the user tracking events, a tracking event processing job module 312 may be used to build the user profile by mapping the tracking events into their own semantic attributes and sent for storage at the user profile database 318. Note that in addition to the event, other attributes may be collected including duration, time, etc. and sent for processing and storage in the user profile database 318. The tracking event processing job module 312 may be designed to batch user events, run on a batch by batch mode, or on a predetermined interval. In some embodiments, the tracking event processing job module 312 may be designed to operate a continuous mode.

Because there may be some latency between a user event that last occurred and the use of the tracking event processing job module 312, a real-time user profile storage unit 314 may also be used and provided directly to the recommendation engine 320. With the combination of the real-time user profile storage unit 314 and the user-profile database 318, the recommendation engine 320 may obtain a complete picture of the user likes/dislikes, profile without any loss in events that may have not been captured by the tracking event processing job module 312. Thus, at a time of a recommendation, the recommendation engine 320 is able to directly access the latest user tracked events. When a recommendation request is received, the recommendation engine 320 may take an ID associated with the user from the request and access the longer-term user profile data in the user profile database 318 and the short-term data from the real-time user profile storage unit 314. At this point, further processing may occur where both the long-term and short-term user profile data are converted to include the semantic attributes so that when the recommendation engine 320 access the user profile data and the product data, both sets of information are in the same format (using semantic attributes) and the user-profile likelihood algorithm may be used and applied to the data to generate the recommendation 320 to the user. Note that the recommendation may be presented on the user device 102 in the form of a UI, included on a merchant site, posted as an advertisement, or displayed similar that presented and described above and in conjunction with FIG. 2.

Note that the various storage units and modules described within FIG. 3 may reside independent of the merchant and on a system or subsystem of a separate entity designed to aid in making content-based recommendations. Alternatively, the modules and storage units may reside within the merchant system. In some embodiments, the modules and storage units may reside as part of a service provider wherein the product catalog 304 received from the merchant and the user information received from the user device 102 are used to determine and used to present a recommendation 322 to a user. Also note that although merchant sites are used here for tracking, user purchases, browsing, gifts received, discussion on a particular product via text, voice, or the like may also be used to update the user profile database 318. The examples of events and the order and arrangement may vary, and one or more modules, systems, and storage units may be added and/or removed from the flow described here.

Now that the recommendation engine 320 is ready to make a recommendation, the user-profile likelihood model may be used. The recommendation is such that the product recommend a product to a user with a high probability that the product is relevant to the user based on the user profile. To create the user profile likelihood model, the information and product data first need to be converted to represent the products or a frequency. The frequency can be considered a user event, for example a user interaction with a product, where the product is the user is interacting with. The products may be considered the tokens. In addition, each token may also be associated with a timestamp which may be used later in weighing the product.

Therefore, using the tokens and frequency, products may be ranked by probability P(p|u), where u is the user profile and the probability of a product is interpreted as the likelihood that it is relevant to the user profile and expressed as $$P(p|u) = \frac{P(u|p)P(p)}{P(u)}$$

where P(u) is the same for all products and may be ignored. Next, considering the probability of a product P(p), in general, this may be uniform across all products, and may be ignored. Thus, under the assumption that all semantic attributes in a user profile are independent from each other, the likelihood that a product is relevant to the user based on the profile may be expressed as $$P(u|p) = \Pi_{u_i \in u} P(u_i|p).$$

Now given that the data has been converted and expressed by semantic attributes and semantic attributes may appear in a user profile multiple times, the attributes may be added to the probability and further expressed by $$P(u|p) = \prod_{t \in u} P(t|p)^{tf_{t,u}}$$

where $tf_{t,u}$ is the raw count of a term t in a user profile u. Thus, for each token, the product will be a term frequency within the profile and this provides a simplification for those tokens that repeat.

Next, to determine the probability of the term for each product P(t|p), using a representation commonly used in language models, consider first the probability for a sematic attribute t in a product p, then $$\hat{P} = (t|M_p) = \frac{tf_{t,u}}{L_p}$$

where $L_p$ is the number of tokens in the product.

A difficulty is encountered using this type of representation may occur where the token is not appearing in this product, then the probability of the token becomes zero, this however this is an error. This token should instead be a small number more general to whole or entire population of the product. Additionally, because of this representation, it would be useful to add some smoothing.

Therefore, using a product specific multinomial and a multinomial distribution estimated from the entire population, the probability of the term for each product may now be expressed as $$\hat{P}(t|p) = (1-\lambda)\hat{P}_{mle}(t|M_p) + \lambda \hat{P}_{mle}(t|M_c)$$

where $0 \leq \lambda \leq 1$ and $M_c$ is a language model built from the entire product collection, and $$\hat{P}_{mle}(t|M_c) = \frac{tf_{t,u}}{L_c}$$

as the first attempt at smoothing. This smoothing representation however, may not be sufficient to account for the sparsity effect. As such, a second smoothing representation may be used. For this, the representation of the probability may be used where in this case a weighted factor for use in the estimation on the entire collection. Using this, the multinomial distribution may be conjugated with the prior Bayesian representation to create the following probabilistic representation $$\hat{P}(t|p) = \frac{tf_{t,u} + \mu \hat{P}_{mle}(t|M_c)}{L_p + \mu}.$$

The representation above however, is not as smooth and precise as to would liked for the type of estimations required. Therefore, combining the two smoothing representations is used to generate smoother, more precise estimations such that the probability may now be represented by $$\hat{P}(t|p) = (1-\lambda)\frac{tf_{t,u} + \mu \hat{P}_{mle}(t|M_c)}{L_p + \mu} + \lambda \hat{P}_{mle}(t|M_c).$$

This two-step smoothing process helps not only provide smoother more precise estimations, but also provides improved estimates when products are encountered that have very few semantic attributes or attributes in user profiles that are not seen in products. Provided this new representation is used for the probability, $tf_{t,u}$ is the term frequency that needs to be evaluated further, as terms within a user profile may not be entirely independent of each other. For example, consider the instances where a term appears in a user profile, the chance that the term is repeated or appears again is higher. As another example, consider a user who is interested in an attribute, if semantic attribute appears two or more times, this does not mean the user is two times more interested in the attribute. As such, the probability representation should have a more sub-linear relationship with regards to the term frequency. In one embodiment, the term frequency is expressed as a logarithmic scale frequency, taking the form $tf_{t,u} = \log(1+f_{t,u})$, where $f_{t,u}$ is used to represent the number of times the term t appeared in the user profile u.

As previously indicated, one of the attributes collected from the user device 102 may include time, this time may be useful making the recommendation as well. This is useful particularly because as time goes by, it may be the assumed that user activities representing user interest decay over time. For example, a user may be said to have greater interest if the user interacted with the product an hour ago, as compared to a user interaction that occurred more than a week ago. As such, an exponential decay should be incorporated and used to represent time. Therefore, the term frequency may be more appropriately represented by $$tf_{t,u} = \log(1 + \Sigma_{\tau_i \in u} d^{\tau - \tau_i})$$

Where d is the rate of decay and $d \in (0,1)$, $\tau$ is the time stamp in question, and $\tau_i$ is the time the user interacted with the product term t.

Returning again to the probability representation, it is worth noting that different user activities may differ in significance when representing user interests. This significant may be added by weighting the different interests such that the estimations of probabilities may be linearly expressed as a weighted sum of the product probabilities and expressed as $$P(u|p) = \Sigma_{u_a \in u} w_a P(u_a|p)$$

which becomes $$P(u|p) = \sum_{u_a \in u} w_a \prod_{t \in u} P(t|p)^{tf_{t,u}}$$

$$= \sum_{u_a \in u} w_a \prod_{t \in u} \left( (1-\lambda) \frac{tf_{t,u} + \mu \hat{P}_{mle}(t|M_c)}{L_p + \mu} + \lambda \hat{P}_{mle}(t|M_c) \right)^{tf_{t,u_a}}$$

$$= \sum_{u_a \in u} w_a \prod_{t \in u} \left( (1-\lambda) \frac{tf_{t,u} + \mu \frac{tf_{t,c}}{L_c}}{L_p + \mu} + \lambda \frac{tf_{t,c}}{L_c} \right)^{tf_{t,u_a}}$$

where $tf_{t,u} = \log(1 + \Sigma_{\tau_i \in u} d^{\tau - \tau_i})$. Thus, the context-based recommendation can be made using this user-profile likelihood model, where those products with the higher probabilities are used as recommendations. The products are then output from the recommendation engine, and the recommendation 322 is presented to the user on a UI of the user device 102, on a merchant site, device, or other device available for use in presenting and displaying the recommendation. As an example, a smart user device 102 may be used and described in more detail in conjunction with FIG. 6 below, while the communication between the user device, merchant, and a service provider is described in detail and in conjunction with FIG. 5 below.

Figure 4:
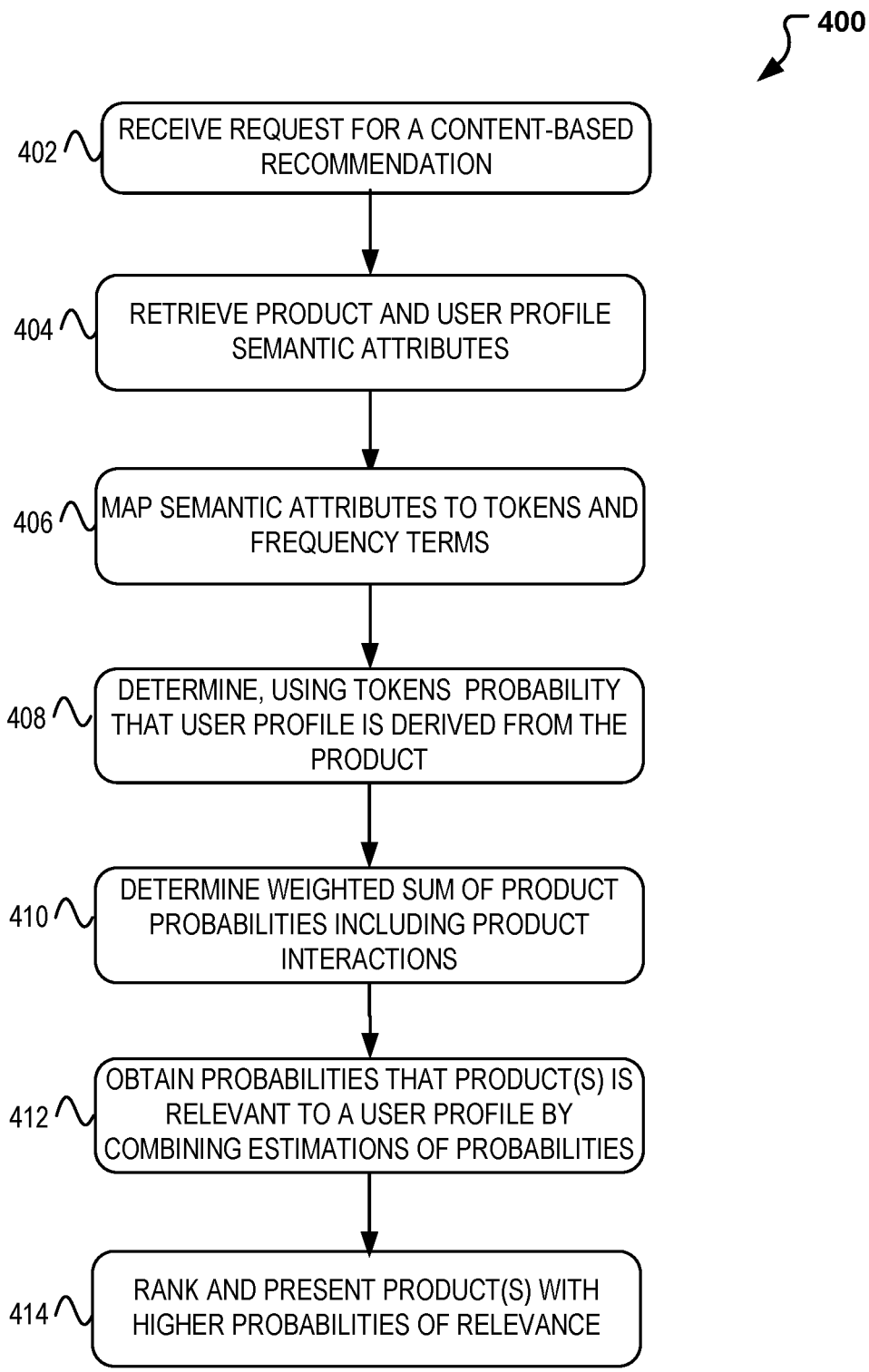
FIG. 4 illustrates a flow diagram illustrating operations for the implementation a content-based recommendation scheme.

Next at FIG. 4, an example process 400 for the implementation for making content-based recommendations using a user profile implemented by a system and method such as that presented above and in conjunction with FIG. 3 presented. In particular, FIG. 4 illustrates a flow diagram illustrating operations for a process used in making product recommendations. According to some embodiments, process 400 may include one or more of operations 402-414, which may be implemented, at least in part, in the form of executable code stored on a non-transitory, tangible, machine readable media that, when run on one or more hardware processors, may cause a system to perform one or more of the operations 402-414.

Process 400 may begin with operation 402, where a system receives a request for a content-based recommendation. The request may arrive in response to a user access of a merchant website, a login into an account, a user interaction with a user device, etc. The recommendation request may be a request to display a product or service offered by an entity. In one embodiment, the recommendation request may be for a recommendation of a product available for sale by a merchant to a user. As such, the recommendation request may include a user ID associated with the request such that the content-based recommendation based in part on a user profile associated with the user making the recommendation request.

To process the recommendation request, process 400 continues to operation 404 where the user's profile information is retrieved using at least the user ID contained in the recommendation request. The user profile may Additionally, at operation 404, the merchant product catalog may be retrieved for use in the content-based recommendation. As previously indicated, the user profile may be contained within a user profile database. The user profile database may include the storage of various actions, products viewed or purchased, or other events performed by the user. In one embodiment, the user profile database, may include product catalog data from the inventory database that includes products the user has purchased from the merchant previously. In addition, time of day and duration of a user interacting with a product may also be stored in the user profile database. Regarding the product catalog, products both current and new arrivals may be stored in a recommendation inventory storage for use by a recommendation engine for making the content-based recommendation.

Once the user and product details are gathered, process 400 continues to operation 406 where the data is the data is converted, transformed, and/or compressed to extract semantic attributes for both the product catalog and user profile (using an event dispatcher). The extraction of such semantic attributes enables the recommendation engine to work with the data that is all similarly formatted. In addition, once the semantic attributes are obtained, then these semantic attributes may be mapped to tokens and frequency terms. The frequency can be considered a user event, for example a user interaction with a product, where the product is when the user is interacting with it. The products may be considered the tokens.

At operation 408, the tokens may be used to determine the probability that the user profile is derived from the product under the language model being used. The probability that the user profile is derived from the product may be obtained using a product of the probabilities for each product while understanding that some semantic attributes may appear on a user profile multiple times and in some instances not at all. Because this, this type of probability representation may encounter a sparsity problem, a two-stage smoothing distribution may be applied in order to achieve smoother, more precise estimations. In addition, each token may also be associated with a timestamp which may be used later in weighing the product.

Further, each product may have a product probability and still further, each user may interact with a product more than one time. The presence of multiple interactions should be accounted for in a sub-linear manner such that, for example, two interactions are not designed to represent that the user is 2× as interested on a product. The interactions are therefore tracked and thus modeled to provide a logarithmic relationship which is incorporated into the frequency term of the probability of the product.

At operation 410, the time the user interacted with a product is considered. For example, it may be assumed a product for a user who interacted with the product today may be more relevant that if the product was interacted by the user a few weeks ago. At operation 410, to consider this timed interaction, the product probability becomes the weighted sum of the product probabilities as a function of time (product interactions).

At operation 412, the estimations of the probabilities are combined to generate the probabilities that the product(s) are relevant to a user. Followed by, operation 414 where product ranking occurs, based on the probabilities obtained at operation 412 and those products found to be more relevant are surfaced to the user. The products may thus be presented on the merchant website, on another website as an advertisement, on the UI of the user device, etc.

Note that although process 400 is described to include weighting, interaction times, smoothing, etc. to occur at a certain operation, these functions can occur in a varied order. Additionally, the number of operation used may vary and/or the process within the operation may also vary in time and/or order. The process is for exemplary purposes and although described here for use with a merchant, other service providers, and/or entities may be used here for making a content-based recommendation that use tailored based in part on a user profile. In addition, a user device has been generally used to describe the tracking of interactions and/or the display of recommendations. Details on such device are described below and in conjunction with FIG. 6.

Figure 5:
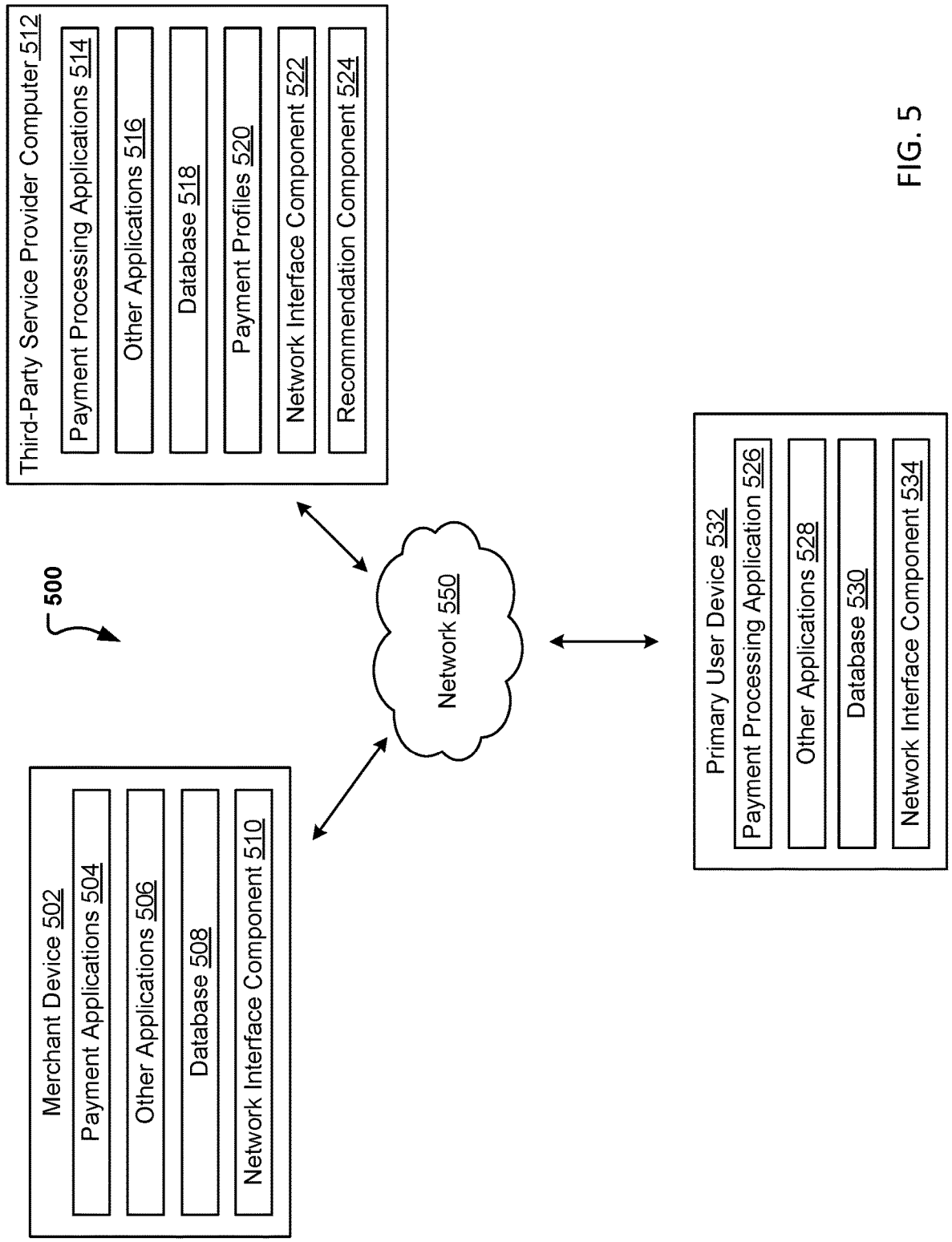
FIG. 5 illustrates a block diagram of a system for making content-based recommendations.

FIG. 5 is a block diagram of a networked system 500 for implementing the processes described herein, according to an embodiment. In particular, FIG. 5 illustrates a block diagram of a system 500 for making content-based recommendations. As shown, system 500 may include or implement a plurality of devices, computers, servers, and/or software components that operate to perform various methodologies in accordance with the described embodiments. It will be appreciated that the devices, computers, and/or servers illustrated in FIG. 5 may be deployed differently and that the operations performed, and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 500 includes a merchant or other third-party device 502, a primary user device 532 (e.g., user device 102), a third-party service provider computer 512 in communication over a network 550. These devices 502, 532, and 512 are exemplary devices that may interact during a transaction and in communication with a website for providing content-based recommendations using user profiles and methods as presented and described above and in conjunction with FIG. 4.

The merchant device 502, primary user device 532, and the third-party service provider computer 512 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 500, and/or accessible over network 550.

The merchant device 502 may be implemented as a communication device that may utilize appropriate hardware and software configured for wired and/or wireless communication with the primary user device 532 and third-party service provider computer 512. For example, the merchant device 502 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, servers, and/or other types of computing devices capable of transmitting and/or receiving data. The merchant device 502 may correspond to and be utilized by a user, such as an employee of a merchant and/or another person authorized by the merchant, or independently as a stand-alone system.

The merchant device 502 may include one or more payment applications 504, other applications 506, a database 508, and a network interface component 510. The payment applications 504 and other applications 506 may correspond to executable processes, procedures, and/or applications with associated hardware. In other embodiments, merchant device 502 may include additional or different components having specialized hardware and/or software to perform operations associated with the payment applications 504 and/or the other applications 506.

The payment application 504 may facilitate financial transactions corresponding to the sale of goods and/or services offered by the merchant. For example, the payment application 504 may provide an interface for customers to purchase the goods or services, make a contribution, and to receive customer payment information (e.g., customer credit card information). The payment application 504 may further transmit customer payment information to a payment processor (e.g., such as a payment processor corresponding to the third-party service provider computer 512) to process the customer payment information. The payment application 504 may also facilitate other types of financial transactions such as banking, online payments, money transfer, donations, and/or the like.

The merchant device 502 may execute the other applications 506 to perform various other tasks and/or operations corresponding to the merchant device 502. For example, the other applications 506 may include security applications for implementing client-side security features, programmatic client applications for interfacing with appropriate application programming interfaces (APIs) over network 550, or other types of applications. In various embodiments, the other applications 506 may include social networking applications. Additionally, the other applications 506 may include device interfaces and other display modules that may receive input and/or output information. For example, the other applications 506 may include a graphical user interface (GUI) configured to provide an interface to the user.

The merchant device 502 may further include a database 508, which may be stored in a memory and/or other storage device of the merchant device 502. The database 508 may include, for example, identifiers (IDs) such as operating system registry entries, cookies associated with the payment application 504 and/or other applications 506, IDs associated with hardware of the network interface component 510, IDs used for payment/user/device authentication or identification, and/or other appropriate IDs. The database 508 may also include information corresponding to one or purchase transactions of customers who have purchased goods or services from the merchant, browsing histories of the customers, or other types of customer information. In certain embodiments, the merchant device 502 may also include information corresponding to payment tokens, such as payment tokens generated by the third-party service provider computer 512.

The merchant device 502 may also include at least one network interface component 510 configured to communicate with various other devices such as the primary user device 102, and/or the third-party service provider computer 512. In various embodiments, network interface component 510 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 512 may be maintained, for example, by a third-party service provider, which may provide payment processing services for the merchant. In one example, the third-party service provider may be provided by PAYPAL™ Inc. of San Jose, Calif., USA. Alternatively, the third-party service provider computer 512 may be associated with a user of the primary device 532. As such, the third-party service provider computer 512 includes one or more payment processing applications 514, which may be configured to process payment information received from the merchant device 502 or from a selection at the primary user device 532. For example, the payment application 504 of the merchant device 502 may receive payment information from a customer to purchase a service or good offered by the merchant. Upon receipt of the payment information, the payment application 504 may transmit the payment information to the third-party service provider computer 512. The payment processing application 514 of the third-party service provider computer 512 may receive and process the payment information. As another example, the payment application 504 can present a payment code on a display of the user device associated with the merchant. The payment code can be scanned or transmitted to the merchant device 502 for payment processing. Still as another example, the payment processing application can present a successful transaction notification on the display of the user device when the application has been authorized and ready for post-processing.

The third-party service provider computer 512 may execute the other applications 516 to perform various other tasks and/or operations corresponding to the third-party service provider computer 512. For example, the other applications 516 may include security applications for implementing client-side security features, programmatic client applications for interfacing with appropriate APIs over the network 550, or other types of applications. The other applications 516 may also include additional communication applications, such as email, texting, voice, and IM applications that enable communication of emails, calls, texts, and other notifications through the network 550. In various embodiments, the other applications 516 may include location detection applications, such as a mapping, compass, and/or GPS applications, which may be used to determine a location of the third-party service provider computer 512. Additionally, the other applications 516 may include device interfaces and other display modules that may receive input and/or output information. For example, the other applications 516 may include a GUI configured to provide an interface to one or more users.

The third-party service provider computer 512 may further include a database 518, which may be stored in a memory and/or other storage device of the third-party service provider computer 512. The database 518 may include, for example, IDs such as operating system registry entries, cookies associated with the payment processing application 514 and/or other the applications 516, IDs associated with hardware of the network interface component 522, IDs used for payment/user/device authentication or identification, transaction IDs, and/or other appropriate IDs.

According to a particular embodiment, the third-party service provider computer 512 may include a set of payment profiles 520 corresponding to past sales transactions executed by the merchant device with respect to one or more customers of the merchant. Alternatively, the third-party service provider computer 512 may include a set of merchant payment profiles corresponding to the payment sources associated to a corresponding merchant. For example, a particular payment profile from the set of payment profiles 520 may include payment information corresponding to a particular customer of the merchant and/or a merchant associated with a user. The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 520 may include payment information corresponding to other customers of the merchant and/or other merchants associated with the user. In addition, the third-party service provider computer 512 may store the set of payment profiles 520 according to a first file format.

The third-party service provider computer 512 may also store a set of payment tokens corresponding to the set of payment profiles 520. For example, each payment profile of the set of payment profiles 520 may be associated with a corresponding payment token from the set of payment tokens. In some embodiments, each payment profile may include a corresponding payment token from the set of payment tokens. The set of payment tokens may be particular to the third-party service provider computer 512 (e.g., computers from other service providers may be unable to use the set of payment tokens) and may enable the merchant device 502 to more securely process payment transactions with the third-party service provider computer 512. For example, in order to process a payment transaction that involves a credit card number associated with a particular payment profile, the third-party service provider computer 512 may provide the merchant device 502 with a particular payment token that is different from the credit card number. The merchant device 502 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 502.

In various embodiments, the third-party service provider computer 512 also includes at least one network interface component 522 that is configured to communicate with the merchant device 502 and/or the primary user device 532 via the network 550.

The third-party provider computer 512, may also include a recommendation component 524 that may be used for making content-based recommendations using a user profile likelihood model. In one embodiment, the recommendation component 524 may include modules and storage units design to gather, transform, and map semantic attributes associated with a user profile and product catalog. Additionally, or alternatively, the recommendation component, may communicate with the modules and storage units which may reside external to the third party-service provider computer 512. In some embodiments, the recommendation component 524 provides a communication with architecture 300 for obtaining and presenting the content-based recommendations determined to a user communicating with the third-party service provider computer 512. In other embodiments, the recommendation module 524 may reside in the primary user device 532 and/or merchant device 502.

The primary user device 532 may be implemented as a communication device that may utilize appropriate hardware and software configured for wired and/or wireless communication with the merchant device 502 and third-party service provider computer 512. The primary user device 532, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 532 may be mobile device communicating with wearable device (or secondary user device), merchant device 502, or directly with the third-party service provider system 512.

The primary user device 532 may include a payment processing application 526 that may be used as a digital wallet that can communicate with a merchant device 502, a secondary user device, and/or third-party service provider 512 for purchasing and transacting. The payment processing application 526, can work jointly with database 530 for retrieving bank account information, user accounts, security codes, tokens that may be associated with various merchant locations, charities, and other relevant causes. Similarly, the payment processing application, can also provide access the user profiles for determining which payment method, processing code, and/or recommendation or tailored information to provide.

The primary user device 532 may also include other applications 528 to perform various other tasks and/or operations corresponding to the primary user device 532. For example, the other applications 528 may facilitate communication with the merchant device 502, such as to receive an indication, from the merchant device 502, to switch payment processing services from the third-party service provider to the service provider.

The primary user device 532 may further include a database 530, which may be stored in a memory and/or other storage device of the primary user device 632. The database 530 may include, for example, identifiers (IDs) such as operating system registry entries, cookies associated with a web browser and/or the other applications 528, IDs associated with hardware of the network interface component 534, IDs used for payment/user/device authentication or identification, bank information, merchant information, user accounts, and/or other appropriate IDs.

The primary user device 532 may also include at least one network interface component 534 configured to communicate with various other devices such as the merchant device 502 and/or the third-party service provider computer 512.

Figure 6:
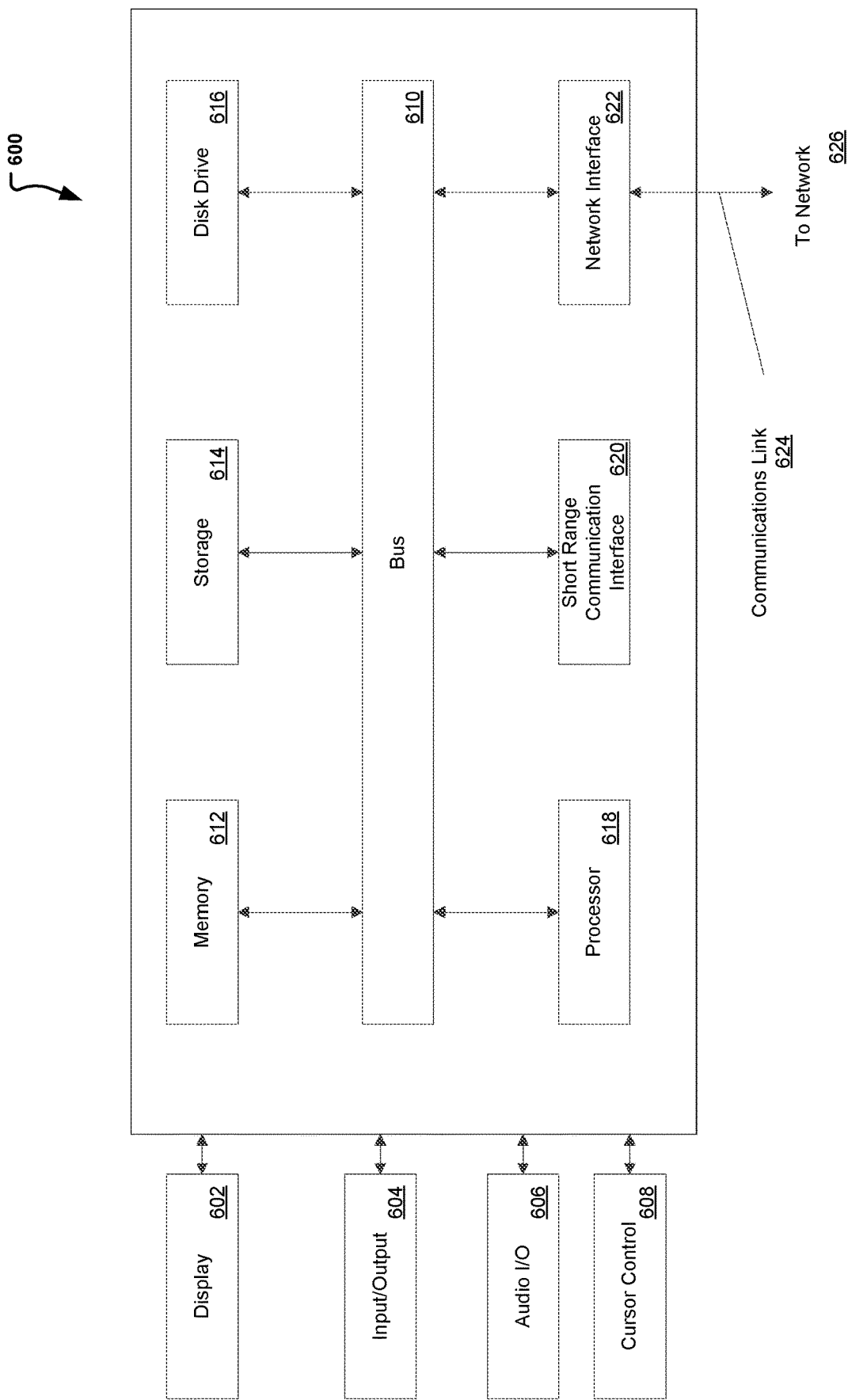
FIG. 6 illustrates an example block diagram of a computer system suitable for implementing one or more devices of the communication systems of FIGS. 1-5.

FIG. 6 illustrates an example computer system 600 in block diagram format suitable for implementing on one or more devices of the system in FIG. 3. In various implementations, a device that includes computer system 600 may comprise a computing device (e.g., a smart or mobile device, a computing tablet, a personal computer, laptop, wearable device, PDA, server, etc.) that is capable of communicating with a network 626. A service provider and/or a content provider may utilize a network computing device (e.g., a network server or third-party service provider computer 512) capable of communicating with the network 626. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 may include an image sensor for capturing images and/or video, such as a complementary metal oxide semiconductor (CMOS) image sensor, and/or the like. An audio input/output component 606 may also be included to allow a user to use voice for inputting information by converting audio signals. Audio I/O component 606 may allow the user to hear audio. A transceiver or network interface 622 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612. Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short-range communications interface 620. Short range communications interface 620, in various embodiments, may include transceiver circuitry, an antenna, and/or waveguide. Short range communications interface 620 may use one or more short-range wireless communication technologies, protocols, and/or standards (e.g., WIFI, Bluetooth®, Bluetooth Low Energy (BLE), infrared, NFC, etc.).

Short range communications interface 620, in various embodiments, may be configured to detect other devices (e.g., primary user device 532, merchant device 502, etc.) with short range communications technology near computer system 600. Short range communications interface 620 may create a communication area for detecting other devices with short range communication capabilities. When other devices with short range communications capabilities are placed in the communication area of short range communications interface 620, short range communications interface 620 may detect the other devices and exchange data with the other devices. Short range communications interface 620 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short-range communications protocol, such as Wi-Fi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants/vendors and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising
a non-transitory memory storing instructions; and
one or more processors coupled with the non-transitory memory and configured to execute the instructions to cause the system to perform operations rising:
extracting, using a natural language algorithm, first semantic attributes associated with a first product from a product catalog, the natural language algorithm configured to extract the first semantic attributes in a structured format;
extracting second semantic attributes associated with a user profile including information about an action performed by the user and related to the first product;
determining, based on the extracted first and second semantic attributes, a probability indicating a relevance of the first product to the user; and
generating a content-based recommendation for the first product based on the probability.

2. The system of claim 1, wherein the information includes an amount of time that has lapsed since the action was performed by the user.

3. The system of claim 1, wherein the user profile is based, at least in part, on tracking a user device of the user.

4. The system of claim 1, wherein the action performed by the user includes an interaction of the user with a second product of a merchant of the first product.

5. The system of claim 1, wherein the probability is determined using a probability function for determining a conditional likelihood of the extracted first semantic attributes being associated with the user profile provided the second semantic attributes are associated with the user profile.

6. The system of claim 1, wherein the action performed by the user includes an activity of the user, via a user device of the user, on a merchant site of a merchant of the first product.

7. The system of claim 1, wherein the second semantic attributes are extracted in said structured format.

8. A method comprising:
extracting, using a natural language algorithm, first semantic attributes associated with the first product from a product catalog, the natural language algorithm configured to extract the first semantic attributes in a structured format;
extracting second semantic attributes associated with a user profile including information about an action performed by the user and related to the first product;
determining, based on the extracted first and second semantic attributes, a probability indicating a relevance of the first product to the user; and
generating a content-based recommendation for the first product based on the probability.

9. The method of claim 8, wherein the user profile is based, as least in part, on tracking a user device of the user.

10. The method of claim 8, wherein the action performed by the user includes an interaction of the user with a second product of a merchant of the first product.

11. The method of claim 8, wherein the probability is determined using a probability function for determining a conditional likelihood of the extracted first semantic attributes being associated with the user profile provided the second semantic attributes are associated with the user profile.

12. The method of claim 8, wherein the action performed by the user includes an activity of the user, via a user device of the user, on a merchant site of a merchant of the first product.

13. The method of claim 8, wherein the second semantic attributes are extracted in said structured format.

14. A non-transitory machine readable medium having stored thereon machine readable instructions executable to cause a machine to perform operations comprising:
extracting, using a natural language algorithm, first semantic attributes associated with the first product from a product catalog, the natural language algorithm configured to extract the first semantic attributes in a structured format;
extracting second semantic attributes associated with a user profile including information about an action performed by the user and related to the first product;
determining, based on the extracted first and second semantic attributes, a probability indicating a relevance of the first product to the user; and
generating a content-based recommendation for the first product based on the probability.

15. The non-transitory machine-readable medium of claim 14, wherein the information includes an amount of time that has lapsed since the action was performed by the user.

16. The non-transitory machine-readable medium of claim 14, wherein the probability is determined using a probability function for determining a conditional likelihood of the extracted first semantic attributes being associated with the user profile provided the second semantic attributes are associated with the user profile.

17. The non-transitory CRM of claim 14, wherein the information includes an amount of time that has lapsed since the action was performed by the user.

18. The non-transitory CRM of claim 14, wherein the user profile is based, at least in part, on tracking a user device of the user.

19. The non-transitory CRM of claim 14, wherein the action performed by the user includes an interaction of the user with a second product of a merchant of the first product.

20. The non-transitory CRM of claim 14, wherein the action performed by the user includes an activity of the user, via a user device of the user, on a merchant site of a merchant of the first product.

* * * * *

UNITED STATES PATENT AND TRADEMARK OFFICE
CERTIFICATE OF CORRECTION

PATENT NO. : 10,984,461 B2  
APPLICATION NO. : 16/232907  
DATED : April 20, 2021  
INVENTOR(S) : Zexi Mao Page 1 of 1

It is certified that error appears in the above-identified patent and that said Letters Patent is hereby corrected as shown below:

In the Claims

At Column 17, Claim 1, Line 51: please replace "operations rising" with "operations comprising"

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*